MULTIPLE CONNECTION ELECTRONIC SWITCHING NETWORK

Filed May 20, 1955 2 Sheets-Sheet 1

INVENTOR
R. W. KETCHLEDGE
BY [signature]
ATTORNEY

July 15, 1958 R. W. KETCHLEDGE 2,843,674
MULTIPLE CONNECTION ELECTRONIC SWITCHING NETWORK
Filed May 20, 1955 2 Sheets-Sheet 2

INVENTOR
R. W. KETCHLEDGE
BY
[signature]
ATTORNEY

United States Patent Office 2,843,674

Patented July 15, 1958

2,843,674

MULTIPLE CONNECTION ELECTRONIC SWITCHING NETWORK

Raymond W. Ketchledge, Whippany, N. J., assignor to Bell Telephone Laboratories, Incorporated, New York, N. Y., a corporation of New York Application May 20, 1955, Serial No. 509,750

11 Claims. (Cl. 179—18)

Figure 1:
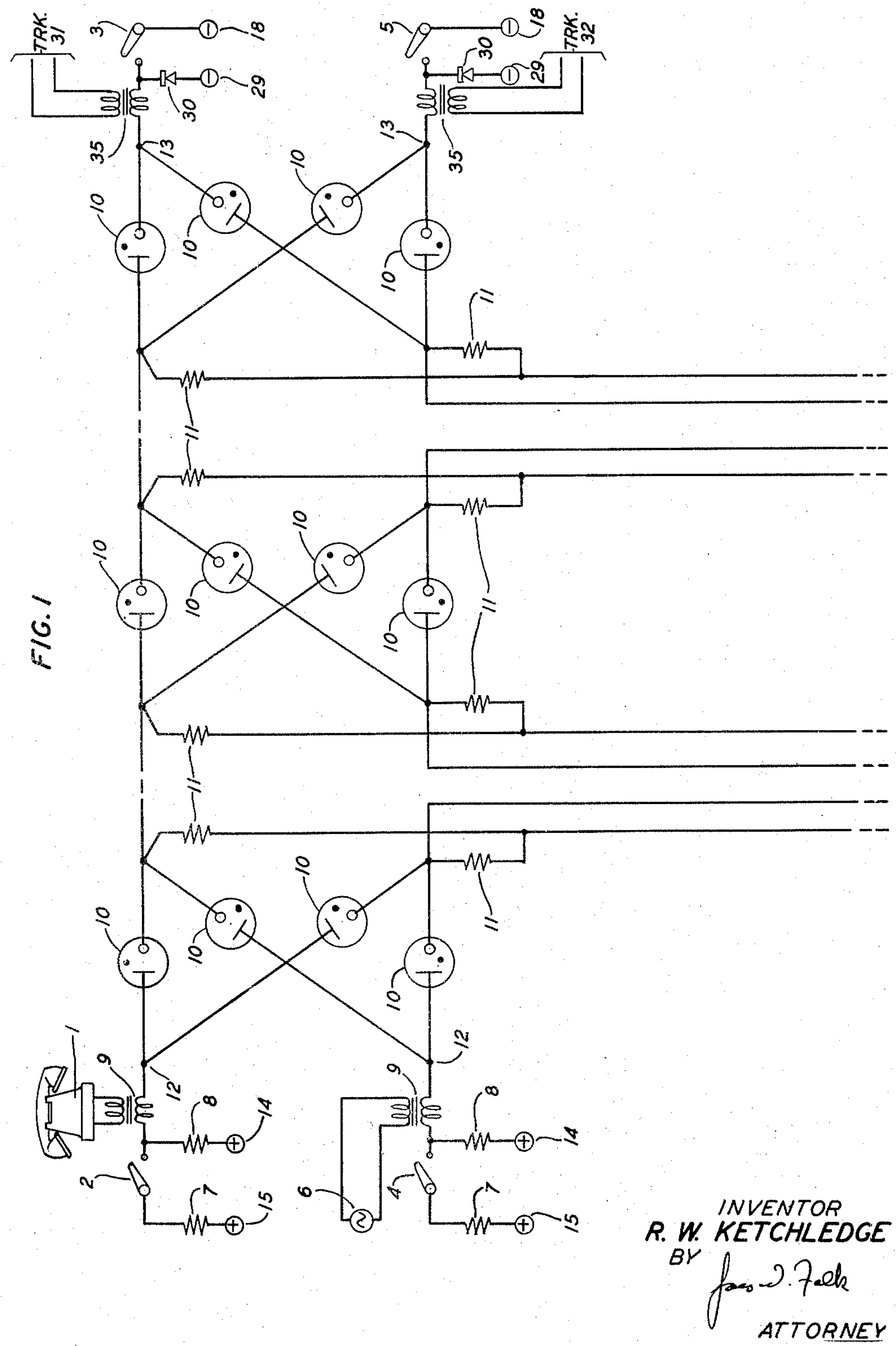

This invention relates to communication switching networks and, more particularly, to the establishment of interconnections between terminals of such networks.

Switching networks are known which contain a large number of interconnected electronic devices, designated as cross points, which may be rendered conductive selectively to establish paths between predetermined input and output terminals. One of these input terminals is connected to each of the subscribers' lines, signaling source, or incoming trunks, and one of the output terminals is connected to each outgoing trunk. These crosspoint devices are rendered conductive by applying marking potentials to the selected terminals and to the nodes or crosspoint connecting points within the network. One such switching network is described in Bruce-Straube Patent 2,684,405, issued July 20, 1954.

Priorly, potentials have been applied to the selected terminals through impedances of high values designated as lockout impedances. Lockout is defined as that condition which exists when any random interconnection of lines is prevented between an established path and an additional path in the process of being established or already established.

In prior systems employing crosspoint networks, provision has been made for signaling between the calling and called parties by circuitry external to the crosspoint network. This circuitry was employed solely for the purpose of signaling. Similarly in such systems provision is made for an intraoffice or revertive call by means of circuitry external to the crosspoint network. The prior systems cannot, however, set up intraoffice conference calls between several subscribers or interoffice conference calls in which a number of subscribers are to be connected to the same trunk terminal of the network.

A general object of this invention is to enable multiple connections through crosspoint switching networks.

A further object of this invention is to provide for the interconnection of a number of input lines to a single output terminal within the crosspoint network.

Another object of this invention is to provide improved switching circuits which are adapted to establish conference calls on an interoffice basis.

Still another object of this invention is to provide circuits for signaling through the crosspoint communications network.

A further object of this invention is to provide for signaling and talking over the same trunk through the crosspoint network.

A still further object of this invention is to provide for intraoffice conference calls by interconnecting circuits within the crosspoint network.

Briefly, in accordance with this invention, combinations of impedances are employed at the input terminals and output terminals such that interconnection between two or more terminals of one side of the network and a terminal on the distant side of the network, may be accomplished. For example, in order to establish an intraoffice or revertive call, two input terminals connected to separate subscriber lines are connected to one opposite terminal; in accordance with an aspect of this invention a marking potential is applied to that opposite terminal through a low impedance source while marking potentials are applied to the two subscribers' terminals or input terminals through lockout impedances. Concurrently with the application of these potentials to the selected terminals, marking potentials are applied to the nodes within the crosspoint network. The application of these potentials to the terminals and nodes causes a conducting path to be established between each of the input terminals and the opposite terminal, thereby establishing an intraoffice call by a crossconnection within the crosspoint network.

The application of marking potentials to the nodes of the crosspoint switching network may advantageously be controlled by circuits of the type disclosed in Patent No. 2,684,405 to E. Bruce and H. M. Straube or of the type disclosed in my application Serial No. 496,749, filed March 25, 1955, now Patent 2,779,822, issued January 29, 1957.

Similarly in accordance with this invention two subscribers may be connected to a common trunk, thus establishing an interoffice conference call through the crosspoint network. For such a connection the marking potential is applied to the trunk terminal through a low impedance path while concurrently marking potentials are applied to the two subscribers' terminals through the lockout impedances.

The same principles employed in establishing the aforementioned interoffice conference call may also be employed in accordance with aspects of this invention to connect a source of signaling potential and a subscriber line to a trunk through the crosspoint network, thereby eliminating the necessity for signaling paths external to the crosspoint network. In this situation, a source of signaling potential connected to one of the input terminals and the calling subscriber line connected to another of the input terminals of the crosspoint network are interconnected within the crosspoint network. The application of marking potentials to the selected trunk through a low impedance source and to the subscriber line terminal and the signaling source terminal through high impedance sources with concurrent application of marking potentials to the nodes interconnects the subscriber and the signaling source at the trunk terminal.

Accordingly, it is a feature of this invention that multiple connections be attained through a crosspoint switching network between a plurality of input terminals and a single output terminal by applying marking signals to the input terminals through lockout impedances and a marking signal to the output terminal through a low or substantially zero impedance connection.

It is another feature of this invention that a low resistance inductor having a high impedance to audio frequencies be interposed between the output terminal of a crosspoint switching network and the low impedance source of marking potential so that, on establishment of multiple connections through the network, audio frequency signals will flow back from the output terminal to the input terminals to which it is connected.

It is a further feature of this invention that a ringing or signaling source be coupled to one of the input terminals, the ringing source terminal and another input terminal being connected through the network to a single output terminal so that ringing signals can be applied to the marked output terminal as soon as the paths between the marked input and output terminals are set up.

It is a still further feature of this invention that revertive calls can be set up rapidly in a single operation by marking a revertive output terminal through a low impedance while marking the various input terminals through lockout impedances, all paths being set up simultaneously rather than in succession as has priorly been done.

It is still another feature of this invention to utilize impedances of different values in the terminal marking circuits on a selective basis to effect different connections and multiple connections within the switching network and between the terminals.

Further, it is a feature of this invention to employ high impedances in the input terminal marking circuit and low impedances in the output terminal marking circuit to control the interconnection within the crosspoint switch of a signaling circuit, a subscriber's communication circuit and a trunk.

Figure 2:
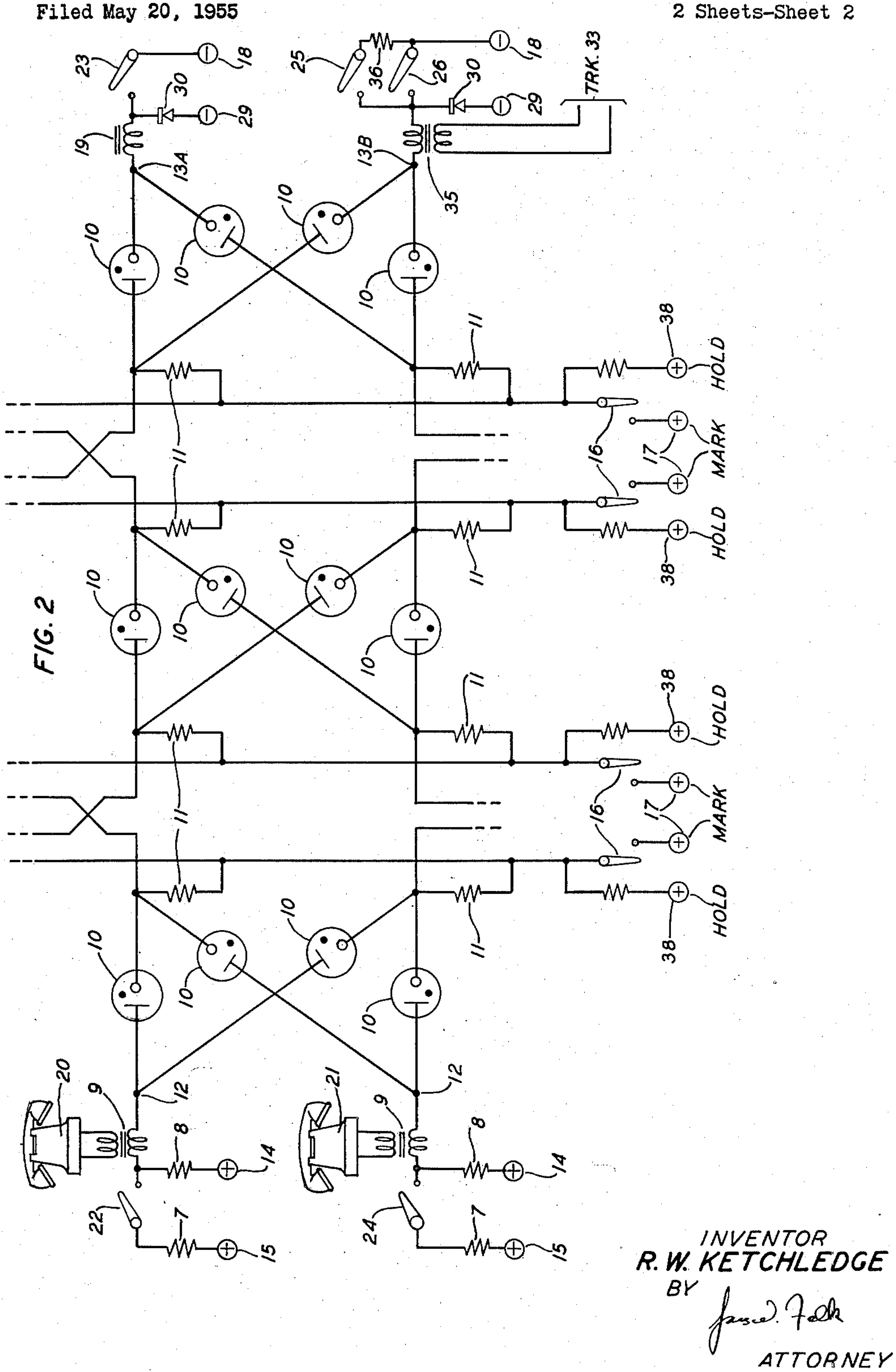

The foregoing and other objects and features of this invention may be understood from the following description when read with reference to the attached drawings in which:

Figs. 1 and 2 depict in schematic form a portion of a switching network illustrative of one specific embodiment of the invention.

Figs. 1 and 2, when positioned adjacent each other, depict in schematic form a partial crosspoint switching network in combination with various circuits for applying control potentials to the terminals of the network as well as exemplary subscriber lines, signaling circuits and trunks. While only three subscribers' lines and three trunks are illustrated, it is to be understood that a large number of subscriber lines and trunks may be connected to the individual terminals of the switching network as required.

Circuitry for recognizing the condition of the subscriber's line and trunk and to perform the switching in response thereto is not depicted. Such circuitry may be any expedient type known in the art. For example, such circuitry may be of the type disclosed in Bruce-Straube Patent No. 2,684,405, July 20, 1954.

In the illustrative embodiment of this invention represented in Figs. 1 and 2 only four input terminals 12 and four output terminals 13 of the switching network are shown. Subscriber telephones 1, 20 and 21 are connected, by line circuits, known in the art, and individual transformers 9 to three of the input terminals. A source 6 of signaling voltage, such as a 1000 cycles per second tone interrupted at a 20 cycles per second rate, is coupled to the other input terminal 12 for the purpose of signaling through the network, as will be hereinafter further explained.

Each of the input terminals 12 is advantageously directly connected through an isolating resistor 8 to an idle bias potential 14. Further each of the input terminals 12 may be connected, by means of a switching element or circuit, to a source 15 of marking voltage through a lockout impedance or resistor 7. Switches 2, 4, 22 and 24 close and open the circuits between the terminals 12 and the lockout impedance 7 and marking bias sources 15 for the input terminals coupled to the subscribers 1, 20 and 21 and the ringing source 6. It is to be understood of course that the switches 2, 4, 22 and 24 are merely illustrative of various devices or circuits to attain the opening and closing of these circuits; thus these functions may advantageously be accomplished by means of gas discharge devices, as disclosed in my application Serial No. 504,433, filed April 28, 1955.

The crosspoint switching network itself may advantageously comprise a plurality of crosspoint devices, such as gaseous diodes 10, connected to define a plurality of possible paths through the switching network. Such gaseous diodes may be of the type disclosed in application Serial No. 169,121, filed June 20, 1950, of M. A. Townsend, now Patent 2,804,565, issued August 27, 1957, which exhibit a negative resistance characteristic in the current and frequency range of operation in the network. The cross-point device however may also be gaseous tetrodes having a pair of starter electrodes, as disclosed in my application Serial No. 426,337, filed April 29, 1954, or they may be transistors, as disclosed in application Serial No. 334,552, filed February 2, 1953, of B. G. Bjornson and E. Bruce; or they may be of any other electronic devices which may be selectely rendered conductive by the application of predetermined voltages thereto.

Marking voltages are applied to the interior nodes of the crosspoint network through individual lockout resistances 11 connected between the nodes and a switch 16 which may be connected to the source 17 of marking potential. The application of marking and hold signals to the interior nodes may be thus accomplished by means of circuits such as disclosed in the above-mentioned Bruce-Straube patent or it may be accomplished by alternating current latching circuits of the types disclosed in my application Serial No. 496,749, filed March 25, 1955, now Patent 2,779,822, issued January 29, 1957.

In accordance with an aspect of this invention each of the output terminals 13 may be marked by closing a switch 2, 5, 23, or 26 to a low impedance source 18 of marking potential. These switches may also be of the type disclosed in my above mentioned application Serial No. 504,433. Each of the output terminals is also connected to a source 29 of holding bias through an isolating diode 30. As no lockout is provided when the trunks are marked, it is necessary, as further discussed below, to remove the marking source 18 from the trunk terminals 13 after the connection has been set up, as by opening the switches 2, 5, 23, and 26, and before the next connection is to be set up through the network, lest the next connection also be made into the occupied output terminal.

Three of the output terminals 13 are coupled, in this embodiment, to output trunks 31, 32, and 33 through individual transformers 35. The fourth output terminal 13A has connected thereto an audio frequency choke 19, ouput terminal 13A being used solely for intraoffice or revertive calls, as discussed further below. Alternatively choke 19 may be inserted between terminal 29 and diode 30.

In addition to attaining multiple connections through a crosspoint switching network, as discussed further below, switching networks in accordance with this invention are also not limited by fan-out currents. In prior networks in which both sides of the network have been marked through lockout impedances, the flow of current through all possible paths, before a match is made between the marked line and marked trunk terminals, causes a voltage drop across the lockout impedance which may be of such a magnitude as to reduce the terminal voltage below the level requisite for marking that terminal. Accordingly either the number of stages in the network must be limited or provision made to assure that this large current does not flow through the terminal lockout impedance; reference may be made to my application Serial No. 496,749, mentioned above, now Patent 2,779,822, issued January 29, 1957, for a further discussion of the fan-out problem and to its solution by using alternating current latching of marked crosspoints, as therein fully described. However in accordance with this invention fan-out current will not cause loss of the mark voltage. This is because there is no lockout impedance at the output terminal and the match between the line and trunk marks is made at a stage sufficiently close to the line terminals that large fan-out currents through the line terminal lockout impedance cannot occur. Advantageously the network may be arranged so that the match occurs across the first stage of the network.

However in certain embodiments of this invention fan-out may not be a problem, as when the interior nodes are latched as described in my above mentioned application Serial No. 496,749, now Patent 2,779,822, issued January 29, 1957, and it may be desirable to have zero impedance marking of the output terminals of the network only for multiple connections within the network and lockout impedance marking for other calls. Accordingly an output terminal may be provided, as seen in Fig. 2, with a pair of switches 25 and 26, switch 26 being closed if a zero impedance marking connection is to be made and switch 25, which is connected to the marking source 18 through a lockout impedance or resistor 36 being closed if a high or lockout impedance marking connection is to be made.

While only three stages of coosspoint devices are indicated, namely, the first, intermediate and last, it is readily understood that any required number of stages may be employed, these three being depicted merely for the sake of convenience. Similarly trunks 31, 32, and 33 merely represent a plurality of trunks sufficient to supply the maximum busy-hour requirements of the numerous lines connected to the input terminals of the network.

For the purpose of explanation of the operation of the embodiments, let us assume that an intraoffice conference call is to be made between telephones 1, 20 and 21. The removal of the handset of telephone 1 may be utilized to signal an operator, through circuitry not shown, that an intraoffice call is to be established between telephones 1, 20 and 21. Switch 23 is moved to its closed position, either by the operator or by suitable automatic switching circuitry, thereby applying marking potentials to the associated terminals of the crosspoint network. When switch 23 is closed, a source of marking potential is applied to the associated terminal through the low resistive inductance of audio frequency choke 19. Accordingly each of the terminals 12 on the input side of the network has a mark signal applied to it through an individual lockout resistor 7, by closure of the switches 2, 4, 22, and 24, while only a single terminal 13A on the other side of the network has a mark signal applied to it directly, there being no lockout impedance.

At the same time that the switch 23 is closed, the switches 16 are also closed to apply suitable marking biases or signals from the sources 17 to all the internodes of the network; these signals are applied through the lockout resistors 11. However as each of the lockout resistors 11 is individual to a crosspoint, only current will flow through it from that one crosspoint. Accordingly, as is known in the art, all possible paths, not including devices employed in priorly established connections, between the marked input and output terminals will be marked and the crosspoint devices thereof ionized. However when a match occurs in the network between the mark from the terminal 13A and the mark from any one terminal 12, a path through the network will be established that will cause a high current to flow through the lockout impedance 7 of that terminal. This lockout impedance will limit the current to that value which will sustain only one path between this terminal 12 and the distant terminal 13A.

In accordance with an aspect of this invention however this lockout occurs only at the input terminals 12. Accordingly a distinct path can be set up between each of the marked terminals 12 and the single marked terminal 13A. Thus a multiple connection may be established between a plurality of input terminals 12 and a single output terminal 13, lockout being provided at the input terminals to assure that but a single path exists through the network from any one input terminal to the output terminal, but no lockout being provided at the output terminal so that multiple paths may exist from that output terminal to the input terminal.

The signaling or ringing current from generator 6 is now applied from its input terminal 12 to the terminal 13A and thence back along the paths priorly established to the terminals 12 coupled to the subscribers 20 and 21. In response to the ringing currents, the subscribers remove the handsets and suitable supervisory circuits, not shown, indicate the completion of the talking path, whereupon the ringing current is removed by the opening of the switch 4.

When the paths between the various input terminals 12 and the single output terminal 13 have been established, the switch 23 should be immediately opened to allow the network to be available for the establishment of additional paths through the network. The opening of switch 23 causes the terminal voltage to decrease to the value of holding source 29, thereby permitting interconnection of this terminal 13 and any other communications path. As there is no lockout impedance associated with the output terminal 13A, any additional paths that were to be established through the network, between other input and output terminals, would also be established to it if the marking signal remained at the terminal. Similarly when the communication paths have been established, the node marking potentials connected through resistors 11 are advantageously removed, the path remaining established by means of the hold potentials from sources 14 and 29.

During the communication over the multiple connection circuit thus established the switches 2, 22 and 24 remain closed, thereby maintaining the paths through the network. When the communication has been completed and each of the handsets restored to its cradle, then each of the switches 2, 22, and 24 is opened, disestablishing the path from its terminal 12 to the distant terminal 13A.

In accordance with an aspect of this invention an audio frequency choke 19 is connected to the terminal 13A for revertive or intraoffice calls to prevent the talking signals from appearing at the hold bias source 29 and to cause the talking or ringing currents to be reflected back to the other input terminals to which terminal 13A is connected.

If, instead of closing switch 23, switch 26 is closed, an interoffice conference call is established over trunk 33 in a manner similar to that of the intraoffice call. Similarly, a conference call may be established over trunks 31 or 32 by closing switches 3 or 5 respectively.

The application of potentials to the terminals 13 through a low impedance source for revertive or conference calls, in accordance with this invention, may be combined with prior systems utilizing high impedance terminal marking in a manner shown in Fig. 2 in which alternatively either switch 25 is used to apply the marking potential from source 18 to its associated terminal 13B through the lockout resistance 36, or switch 26 may be employed to apply the marking potential through a zero impedance source to terminal 13B thereby giving rise to interconections between the several subscribers and trunk 33 as described above.

It is to be understood that the above-described arrangements are illustrative of the application of the principles of the invention. Numerous other arrangements may be devised by those skilled in the art without departing from the spirit and scope of the invention.

What is claimed is:

1. A communication switching circuit comprising a crosspoint network having input and output sets of terminals, means for defining a plurality of paths between said input and output sets of terminals, and means for establishing paths from a plurality of said input terminals to a single one of said output terminals, said last-mentioned means including means for applying a marking voltage to each of said input terminals through a high resistance and means for applying a marking voltage to said one output terminal through a low resistance.

2. A communication switching circuit in accordance with claim 1 wherein a low resistance inductor is connected between said one output terminal and said means for applying a marking voltage thereto, said inductor having a high impedance to audio frequencies.

3. A communication switching circuit in accordance with claim 1 further comprising a plurality of subscriber lines, an output trunk, means coupling each of said subscriber lines individually to distinct ones of said input terminals, and means coupling a trunk to said one output terminal, whereby a plurality of subscribers may be simultaneously connected to the same output trunk through said network.

4. A communication switching circuit in accordance with claim 1 further comprising a plurality of subscriber lines, a plurality of output trunks, a source of signaling voltage, means coupling each of said subscriber lines individually to distinct ones of said input terminals, means coupling said source of signaling voltage individually to one of said input terminals, and means coupling said trunks individually to said output terminals, whereby said signaling voltage may be applied directly through said network to an output trunk to which is also connected through said network one of said subscriber lines.

5. A communication switching circuit in accordance with claim 1 further comprising means for selectively applying a marking voltage to said one output terminal through a low and a high impedance.

6. A communication circuit for establishing conference calls comprising a crosspoint network having line and trunk terminals, crosspoint devices defining connections between each of said input and output terminals, subscriber lines connected to said line terminals, means applying marking potentials to said line terminals including a high internal impedance source, and means for applying marking potentials to said trunk terminals through a low resistance-high reactance source whereby conference calls may be interconnected within the crosspoint network.

7. A communication switching circuit for establishing interoffice conference calls comprising a crosspoint network having line and trunk terminals, crosspoint devices defining connections between each of said input and output terminals, subscriber lines connected to certain of said line terminals, means for applying marking potentials through a high impedance to said line terminals, and means associated with certain of said trunk terminals for applying a marking potential thereto through a low impedance source whereby interconnections are obtained between selected subscriber lines and one of said trunk terminals within the crosspoint network.

8. In a communication switching circuit, a plurality of input lines, a plurality of output lines, means including a crosspoint network having input and output terminals respectively for defining paths between one or more of said input lines and predetermined output lines, means comprising a high internal impedance source adapted to be selectively connected to the input terminals of said crosspoint network for applying a marking potential thereto, and a low internal impedance source adapted to be selectively connected to said output terminals.

9. In a communications switching circuit, a plurality of input lines, a plurality of output terminals, means including a crosspoint network connected between said input lines and said output terminals for defining paths between selected input lines and selected output terminals, means including a high impedance source adapted to be selectively connected to said lines to apply a marking potential thereto, and means including a choke coil for applying a marking potential to at least one of said trunk terminals.

10. A communication switching system in accordance with claim 9 including a ringing generator connected to one of said line terminals in energy transfer relationship.

11. A communication switching circuit comprising a crosspoint network having a plurality of terminals, means within said network for defining a plurality of paths between said terminals, and means for applying marking and sustaining potentials to said terminals for establishing certain of said paths, said last mentioned means including means for applying said potentials to certain of said terminals through high resistive impedance and means for applying said potentials to certain other of said terminals through low resistive impedances.

No references cited.